US005659479A

United States Patent [19]
Duley et al.

[11] Patent Number: 5,659,479
[45] Date of Patent: *Aug. 19, 1997

[54] METHOD AND APPARATUS FOR REAL-TIME CONTROL OF LASER PROCESSING OF MATERIALS

[75] Inventors: Walter W. Duley; Grant Kinsman, both of Waterloo, Canada

[73] Assignee: Powerlasers Ltd., Concord, Canada

[ * ] Notice: The term of this patent shall not extend beyond the expiration date of Pat. No. 5,517,420.

[21] Appl. No.: 600,108

[22] Filed: Feb. 12, 1996

Related U.S. Application Data

[63] Continuation of Ser. No. 328,762, Oct. 24, 1994, Pat. No. 5,517,420.

[30] Foreign Application Priority Data

Oct. 22, 1993 [GB] United Kingdom ................ 9321866

[51] Int. Cl.⁶ .................................................. G06F 19/00
[52] U.S. Cl. ................... 364/474.08; 395/900; 395/904; 219/121.6
[58] Field of Search .................... 364/474.08, 551.01, 364/552, 472.01, 477.01, 477.06; 395/900, 903, 904, 912; 219/121.6–121.85, 110

[56] References Cited

U.S. PATENT DOCUMENTS

| 4,560,100 | 12/1985 | Hall . | |
|---|---|---|---|
| 5,304,768 | 4/1994 | Ishikaza | 219/110 |
| 5,517,420 | 5/1996 | Kinsman et al. | 364/474.08 |

OTHER PUBLICATIONS

Farson D.F. et al. "Intelligent Laser Welding Control", ICALEO '91 Laser Materials Processing, vol. 1722, 1991, San Jose (US), pp. 104–112.

Chen H.B. et al. "Laser Processing Monitoring With Dual Wavelength Optical Sensors," ICALEO '91 Laser Materials Processing, vol. 1722, 1991, San Jose (US), pp. 113–122.

Denney P.E. et al. "Laser Video Camera System Study of High Power Laser Material Interactions" ICALEO '91, San Jose (US) pp. 84–93.

Sameda, Yoshito "Fuzzy Seam–Tracking Controller", Heavy Apparatus Engineering Laboratory, Toshiba Corporation IEEE, 1992, pp. 966–970.

Kaneko, Yasuyoshi et al. "Sensing of The Weld Pool Depth With Neutral Network and Fuzzy Control of Seam Tracking", IEEE, 1993, pp. 424–429.

*Primary Examiner*—Reba I. Elmore
*Assistant Examiner*—Steven R. Garland

[57] ABSTRACT

There is provided a method and apparatus for controlling, in real-time, processing variables in laser processing of materials using fuzzy logic control procedures by embedding expertise in the form of a rule base within a fuzzy logic controller. The method uses a visible light detector as part of the control loop to detect light from the laser-material interaction zone. The light is processed to extract spatial information on the size of the interaction zone and in one aspect determines the number of bright pixels above a pre-defined number which effectively gives the spatial extent or area of the visible light emitted from the interaction zone. From this elemental processing two system input variables are obtained, namely the current number of bright pixels, #BP, and the change in this count since the last calculation, $\Delta$BP. These input variables are input to the fuzzy logic controller for an inference pass with the output being used to control a laser processing variable such as laser power, laser intensity and process speed. More than two system input variables may be used to provide greater stability. Integrating the fuzzy logic controller with the image processor provides control of penetration welding of steel plate at a rate of 28 Hz.

14 Claims, 11 Drawing Sheets

VS - VERY SMALL
S  - SMALL
M  - MEDIUM
L  - LARGE
VL - VERY LARGE
LN - LARGE NEGATIVE
N  - NEGATIVE
NC - NO CHANGE
Z  - ZERO
P  - POSITIVE
LP - LARGE POSITIVE

BP

|  | | VS | S | M | L | VL |
|---|---|---|---|---|---|---|
| | LP | NC | NC | P | P | LP |
| | P | NC | NC | N | P | LP |
| ΔBP | NC | LN | N | NC | P | LP |
| | N | NC | NC | P | NC | LP |
| | LN | NC | NC | P | P | LP |

METHOD AND APPARATUS FOR REAL-TIME CONTROL OF LASER PROCESSING OF MATERIALS

This application is a continuation of U.S. patent application Ser. No. 08/328,762 filed on Oct. 24, 1994, now U.S. Pat. No. 5,517,420 entitled "Method And Apparatus For Real-Time Control of Laser Processing Of Materials".

FIELD OF THE INVENTION

The present invention relates to fuzzy logic based control systems for laser processing to control in real-time primary processing variables using feedback from sensors monitoring a laser-material interaction zone.

BACKGROUND OF THE INVENTION

Laser processing of materials such as laser welding, laser annealing, laser cutting and laser cladding of metals and non-metals alike has become an invaluable tool in many industries. For example, laser welding of metal, in any joint configuration, involves the use of laser radiation to heat the surface to temperatures at which melting and, in the case of penetration or "keyhole" welding, some material vaporization occurs. The size of the localized area on the surface, or joint, where this process takes place can be adjusted by an external means, usually by a focusing lens or mirror to adjust the focal point of the laser beam. However, the quality of the weld (weld penetration, morphology, porosity and metallurgical characteristics) can be affected by a number of factors, some of which may rapidly fluctuate during the welding process. The principal variables which can be used to characterize a laser process are divided into three categories; 1) laser beam characteristics such as laser power, beam mode, the temporal profile etc.; 2) laser beam delivery characteristics such as process speed, focal position and the like; and 3) physical and chemical properties of the workpiece such as reflectivity which have an impact on the laser-material interaction, and surface contamination.

The phrase "laser processing" as used herein refers to processes such as laser welding, cladding etc., and the phrase "process speed" as used herein means the rate (distance per unit time or area per unit time) at which the process occurs. This process speed is related to the rate at which a sufficient amount of energy from the laser beam is converted to heat in the workpiece (energy per unit length). The processing may be achieved either by scanning the workpiece under a fixed laser beam or vice versa or by changing laser pulse repetition rate, duty cycle and the temporal pulse profile. When the process is laser welding the process speed is the welding speed.

To illustrate, in $CO_2$ laser penetration welding in sheet steel, the quality of the weld is dramatically reduced when either too little or too much penetration occurs. This occurs when the energy deposition rate is either too high or low and may be corrected by adjusting either the welding speed or laser power. Further, in the case of processing highly reflective metals such as aluminum, the ability to sustain a weld pool is problematic because of the uncertainty of the laser beam coupling to the workpiece. Rapid changes in coupling between the laser beam and workpiece can occur and to maintain a stable welding process corresponding adjustments in laser power, welding speed or focal position are required.

Work on sensor development for in-process integration and optimization of high speed $CO_2$ laser interactions such as laser welding has been underway for a number of years. Chen, H. B., U. L., Brookfield, D. J., Williams, K. and Steen, W. M., Laser Process Monitoring with Dual Wavelength Optical Sensors, ICALEO '91 proceedings, L. I. A. Vol. 74, ICALEO (1991), pp. 113–122, discloses how radiation emitted from the laser-material interaction zone can be analyzed using photodiodes sensitive in infrared (1–2 μm) and ultraviolet (300–500 nm) bands. Comparison of signals from both bands provide information on the quality of the laser weld or cut.

The reference Denney, P. E., Metzbower, E. A., Synchronized Laser-Video Camera System Study Of High Power Laser Material Interactions., ICALEO '91 proceedings, L. I. A. Vol. 74, ICALEO (1991), pp. 84–93 discloses how a strobed laser-camera system may be used to study the laser beam-material interaction zone. The vision system was a pulsed $N_2$ (nitrogen) laser (337 nm) that is synchronized with a CCD (charge coupled device) video camera. The studies resulted in a series of video tape recordings in which laser welds and laser cladding processes were studied.

Farson, D. F., Fang, K. S., Kern, J., Intelligent Laser Welding Control, ICALEO '91 proceedings, L. I. A. Vol. 74, ICALEO (1991), pp. 104–112 discloses how an artificial neural network can be used to analyze acoustic emissions from a weld pool for determination of weld penetration. The output signals from a microphone were digitized and fast fourier transformed with the resulting power spectrum divided into 16 bands which, when averaged, were input into the neural network. Resulting predictions of penetration were obtained at the relatively slow rate of 3 Hz. Attempts at closed loop control using this technique were inconclusive.

Closed loop auto-focusing systems are now almost standard equipment for many laser cutting applications. The distance from the cutting nozzle to the workpiece is preset, and during the cutting process, this distance is maintained within a small margin of error. Similarly, laser power may be controlled by sampling a known fraction of the output beam through a leak mirror in the laser cavity and adjusting the current in the laser discharge accordingly to stabilize the output power. A drawback to both these methods of control is that they do not use information from the laser-material interaction zone directly.

Sensors suitable for monitoring the laser-material interaction zone directly may be roughly divided into two categories. In the first, sensors such as microphones for measuring sound and photo-diodes for detection of light intensity return information relating to the strength or intensity of the signal generated from the laser-material interaction zone. The second category of sensor provides spatial information of this zone. For example, a charge coupled device (CCD) camera is capable of providing spatial information, that is, how the light generated from the process is distributed throughout the video frame.

However, to date the use of machine vision in which video images have been used to acquire spatial information of the laser-material interaction zone has been limited to diagnostic applications only as disclosed in Denney et al. Light from a second laser source irradiates the laser-material interaction zone or weld pool at a specific wavelength where plasma light emission is weak and the reflected light from the weld pool is viewed by the CCD camera through a narrow bandpass filter. This technique is successful as a diagnostic tool but it is expensive and to date no real-time feedback control of primary processing variables has been attempted due primarily to the prohibitive time constraints involved in acquiring and transferring digital images from the frame grabber to the host computer for analysis. Therefore it would be advantageous to provide a real-time control system for laser processing which utilizes feedback from the laser-material interaction zone using sensors from either of the afore-mentioned categories to control the laser process speed which avoids the prior art time constraints for acquiring and manipulating the sensor data.

SUMMARY OF THE INVENTION

It is an object of the present invention to provide a laser processing control system which controls, in real-time, laser processing variables based on feedback from sensors monitoring the laser-material interaction zone.

It is also an object of the present invention to provide a real-time control system using the aforementioned variables which avoids the prior art time constraints associated with acquisition, transference and manipulation of sensor data from the sensor array to the host computer.

These and other objects are achieved by a method and apparatus for embedding fuzzy logic control functions or procedures within a sensor subsystem with the output of the control function being dedicated to control a primary laser processing parameter. Fuzzy logic control is advantageous because software implementation is computationally very light. However, as the number of system inputs increase, the number of rules required to shape the multidimensional control surface becomes very awkward and cumbersome to manage. In order to obviate this difficulty each sensor sub-system is provided with its own fuzzy logic based controller. The provision of a series of sensor subsystems, each with its own fuzzy rule sets, enables each sensor subsystem to operate with a simpler set of rules to manage the information from each dedicated sensor and to provide a dedicated host computer such as a personal computer (PC) with a dedicated error value directly related to a primary laser processing variable.

In this way the host PC is relieved of the computational tasks of image analysis and control functions in the case of optical imaging sensors. Embedding the complete controller in a programmable data acquisition means and by using fuzzy logic technology enables control of laser processing parameters such as laser power, laser intensity and process speed without interference from the host PC.

In one aspect of the invention there is provided a method of real-time control of processing variables in laser processing of a workpiece using fuzzy logic. The method comprises locating the workpiece with respect to a laser so that in use a laser beam emanating from the laser impinges on the workpiece at an interaction zone; detecting signals emitted from the interaction zone due to the interaction of the laser beam with the workpiece and sorting and storing the signals according to at least two preselected characteristics of the interaction zone, whereby signals sorted according to one of the preselected characteristics are stored as a first set of input variables and signals sorted according to the second preselected characteristic are stored as a second set of input variables. The method includes processing the first and second set of input variables to fuzzify the first and second set of input variables wherein said fuzzified first and second set of input variables form antecedents in a rule base, ANDING together the antecedents to form a strength of a rule in said rule base, applying the rule strength to a consequent of the rule to assign the strengths to membership output functions, and defuzzifying the membership output functions to produce an output value. The method includes inputting the output value to means for adjusting at least one processing variable and adjusting the at least one processing variable responsive to the output value.

In another aspect of the invention there is provided an apparatus for control of process variables in the laser processing of a workpiece using fuzzy logic. The apparatus comprises means for locating the workpiece with respect to a laser so that in use a laser beam from the laser impinges on the workpiece at an interaction zone. The apparatus includes means for detecting signals emitted from the interaction zone due to the interaction of the laser beam with the workpiece and means for sorting and storing the signals according to at least two preselected characteristics of the interaction zone. Signals sorted according to one of the preselected characteristics are stored as a first set of input variables and signals sorted according to the second preselected characteristic are stored as a second set of input variables. The apparatus includes processing means for processing the first and second set of input variables by fuzzifying the first and second set of input variables wherein the fuzzified first and second set of input variables form antecedents in a rule base, ANDING together the antecedents to form a strength of a rule in the rule base, applying the rule strength to a consequent of the rule to assign the strengths to membership output functions, and defuzzifying the membership output functions to produce an output value. The apparatus includes means responsive to the output value for adjusting at least one processing variable.

Non-limiting examples of preselected characteristics may include the size of the interaction zone, the change in size of the interaction zone from a previous analysis of the signals, the shape of the interaction zone and the change in shape of the zone from a previous analysis of the signals.

BRIEF DESCRIPTION OF THE DRAWINGS

The method and apparatus for real-time control of laser processing variables forming the subject invention will now be described, by way of example only, reference being had to the accompanying drawings, in which.

BRIEF DESCRIPTION OF THE TABLES

Figure 1:
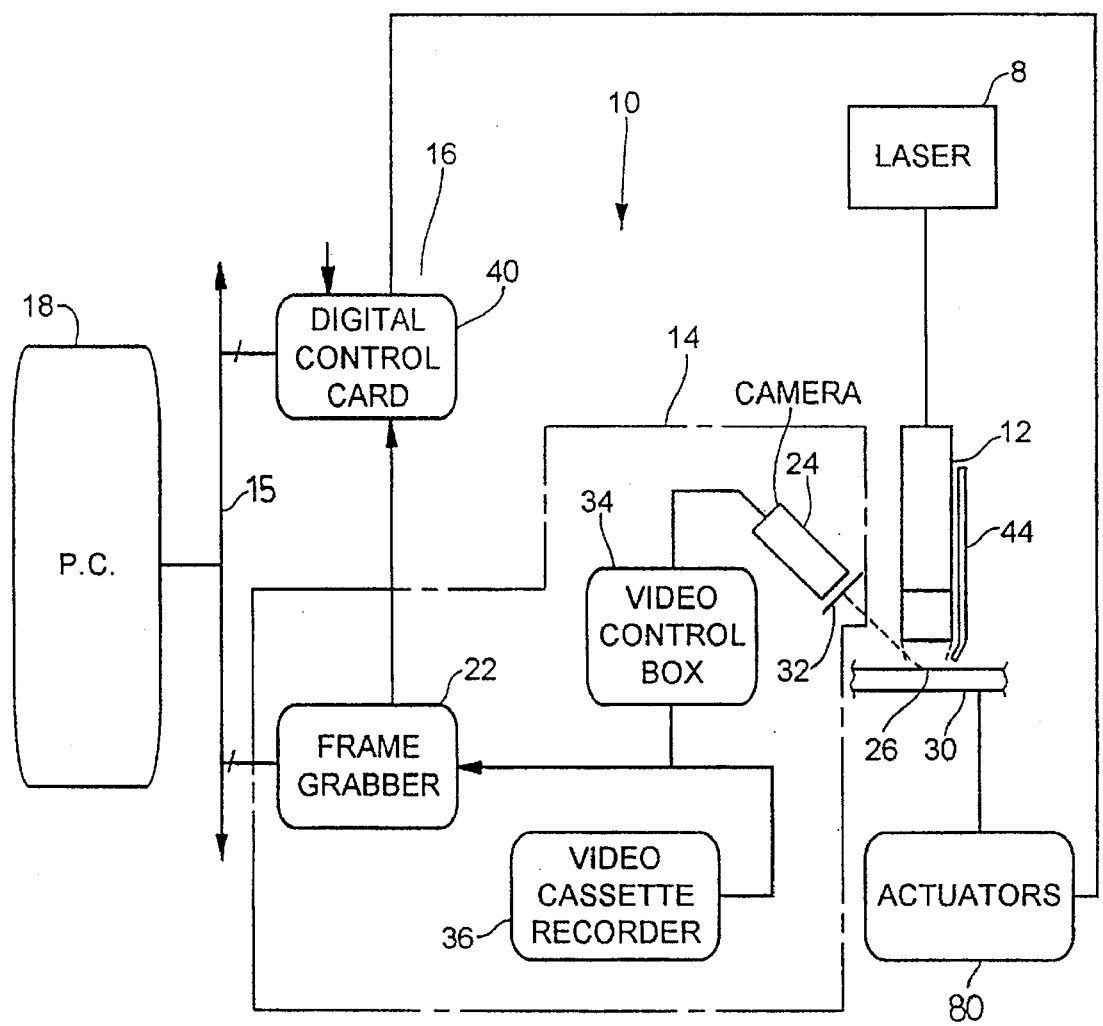
FIG. 1 is a diagrammatic representation of a laser welding apparatus constructed in accordance with the present invention showing the system components and data pathways using a visual encoder where weld speed is directly controlled.

Table I lists the structure proto-types in ANSI C for building lists of systems inputs, outputs (io_type) and the structure for creating each set of membership functions (mf_type) in each fuzzy logic controller;

Table II shows how the structures of mf_type Wc_Functions, the set of membership functions describing the universe of discourse for the system input $s_i$ can be initialized using the variable basept;.

Table III lists the complete set of rules used to implement the visual encoder controller for welding the aluminum alloy 7075-0 and 7075-T6; and Table IV shows how the assigned strengths from the process of rule evaluation can be defuzzified into a single error out value.

DETAILED DESCRIPTION OF THE INVENTION

The present invention provides a method and apparatus for real-time control of laser processing of metals and non-metals such as plastics and the like using sensors with dedicated control procedures so that intelligence is embedded within the sensor subsystem itself. The method of control is provided using fuzzy logic technology. The following description relates to the implementation of the invention as it relates to real-time control of laser welding using a visual sensor as part of the feedback system. It will be understood however that this description is by way of example only and is not limited to laser welding per se. As will be discussed the method can be applied to laser processes other than welding and may be implemented with other types of sensors. Like numerals refer to like components in the drawings.

The code for embedding on the visual subsystem has been developed using fuzzy logic control (FLC) systems. Fuzzy logic systems may be understood as numerical model-free estimators which map system state linguistic inputs such as large number of bright pixels (or size information) to a control output such as large positive change in weld speed in relation to laser welding with a visual encoder. Implementing the fuzzy logic controller requires the development of a set of rules that have the form of if-then statements. The if side of the rule containing the antecedents correspond to the degree of membership calculated from the system input value, such as number of bright pixels. The then side of the rule or the consequent corresponds to the control output function. Thus, fuzzy logic control procedures work well when appropriate fuzzy if-then rules are provided. It is an important aspect of this invention that, by using this method, this expertise can be embedded directly into an intelligent sensor subsystem significantly adding to the possibilities for real time control of the laser process.

Fuzzy logic control is advantageous because software implementation is computationally very light. However, as the number of system inputs increase the number of rules required to shape the multi-dimensional control surface becomes hard to manage. In order to obviate this difficulty the control procedures or functions are embedded within the sensor sub-system itself. This enables a simpler set of rules to manage the information to a sensor and provide to a host controller a dedicated error value directly related to a primary laser processing variable such as welding speed during laser welding. Alternatively, this dedicated error value may be passed directly to a motion subsystem or directly to the laser computer numerical control (CNC). In any case, the host system has been relieved from the computational tasks of image analysis and fuzzy logic control procedures.

Referring to FIG. 1 the system components and data pathways are shown for a laser processing system 10 for processing a workpiece 30. System 10 comprises a laser 8 and focussing optics 12, a visual sensor subsystem 14, a motion subsystem 16 the output of which drives amplifiers and servomotors shown at 80 used to control the motion of workpiece 30, and a host personal computer (PC) 18. A 80386 DX microprocessor based computer acts as the host computer system 18 where the visual sensor subsystem 14 is initialized and information to the operator may be displayed. A PC ISA bus 15 is used to couple visual subsystem 14 and motion subsystem 16 to PC 18. The ANSI C code for incorporating the image processing and fuzzy logic control functions was developed using Texas Instruments TMS320 floating point optimizing C compiler/linker and tools.

Visual sensor subsystem 14 comprises a Dipix Technologies Inc. P360F frame grabber board 22 located on the PC ISA bus and has on board a TI320C30 digital signal processor which is general enough with 4 megabytes of local memory and digital I/O to perform a complete application, Visual subsystem 14 includes a Panasonic GP-CD60 CCD camera 24 focussed on the laser-material interaction zone which includes both weld pool and the plasma located above the weld pool located generally at 26 formed by the laser output interacting with workpiece 30 during the welding operation. An optical filter #10 shade is shown at 32 interposed between CCD camera 24 and the weld pool. The optical filter attenuates the visible light from the laser-material interaction zone so that the pixels in the camera are not saturated and ensures that only light from the melt pool and high temperature spots in plume are sampled. A video control box 34 provides power and controls the electronic shutter and breaks out the RS-170 signal. A video cassette recorder (VCR) 36 is provided to record the welding operation.

Workpiece 30 is mounted for laser processing so that the workpiece is movable with respect to the laser beam. This may be accomplished by workpiece 30 being movable with respect to the fixed laser beam, or vice versa where the laser beam is moved along the surface of the fixed workpiece, or a combination of both. For example, motion subsystem 16 has located on the PC bus a PC based Galil DMC620 servo motion digital control card 40 which controls a 40×40 cm x-y table (not shown) to which workpiece 30 is fixed during operation. Motion control card 40 is provided with an 8-bit digital input port with software interrupt capabilities. The P360F framegrabber 22 programmed as a controller is directly connected to motion control card 40 so that closed looped control of welding speed is provided without interference from host computer 18.

For demonstration, laser 8, a Lumonics VFA 1700 fast axial flow $CO_2$ laser was used operating in a continuous mode with a stable output of 1500 watts. Argon gas at a flow rate of 20 l/min was used for shielding and plasma suppression as shown at 44. Welding speeds were varied from 25 to 6 mm/sec and welding examples of poor penetration (fault) at high speeds, good penetration (no fault) at intermediate speeds and burn through (fault) caused by excessive dwell time at low speeds were recorded. Using this method a visual record of basic error conditions is sufficient to calibrate the controller.

It will be understood by those of ordinary skill in the art that the apparatus embodying the subject invention disclosed herein is by no means limited to the components used in the embodiment in FIG. 1. Any suitable laser capable of providing the required output may be used. Continuous wave (cw) lasers may be used or alternatively, pulsed lasers may be used in which the duty cycle or pulse repetition rate is a further parameter which can be controlled using the method of the present invention. It will be readily apparent to those skilled in the art that multiple laser arrays may be controlled using the method disclosed herein.

Other suitable optical and motion control systems which could be used will be apparent. For example, a miniature bread-board type CCD camera with a built-in lens has been used in the apparatus of the present invention having a resolution of 380 horizontal scan lines and 350 vertical lines of resolution with an automatic electronic shutter. Alternatively, high resolution, high speed colour CCD cameras or cameras sensitive in the infrared may be used. Also, it is not necessary for the camera to output a composite (RS-170) compatible video signal to the image preprocessor. A camera with a digital interface may be used. The image preprocessor embedding the sensor sub-system may be obtained commercially or may be specifically designed for the present application. The hardware platform requires a programmable architecture with a high performance central processing unit (CPU) such as the TI320C30DSP and have sufficient memory on board for embedding the image processing and FLC procedures.

Figure 2:
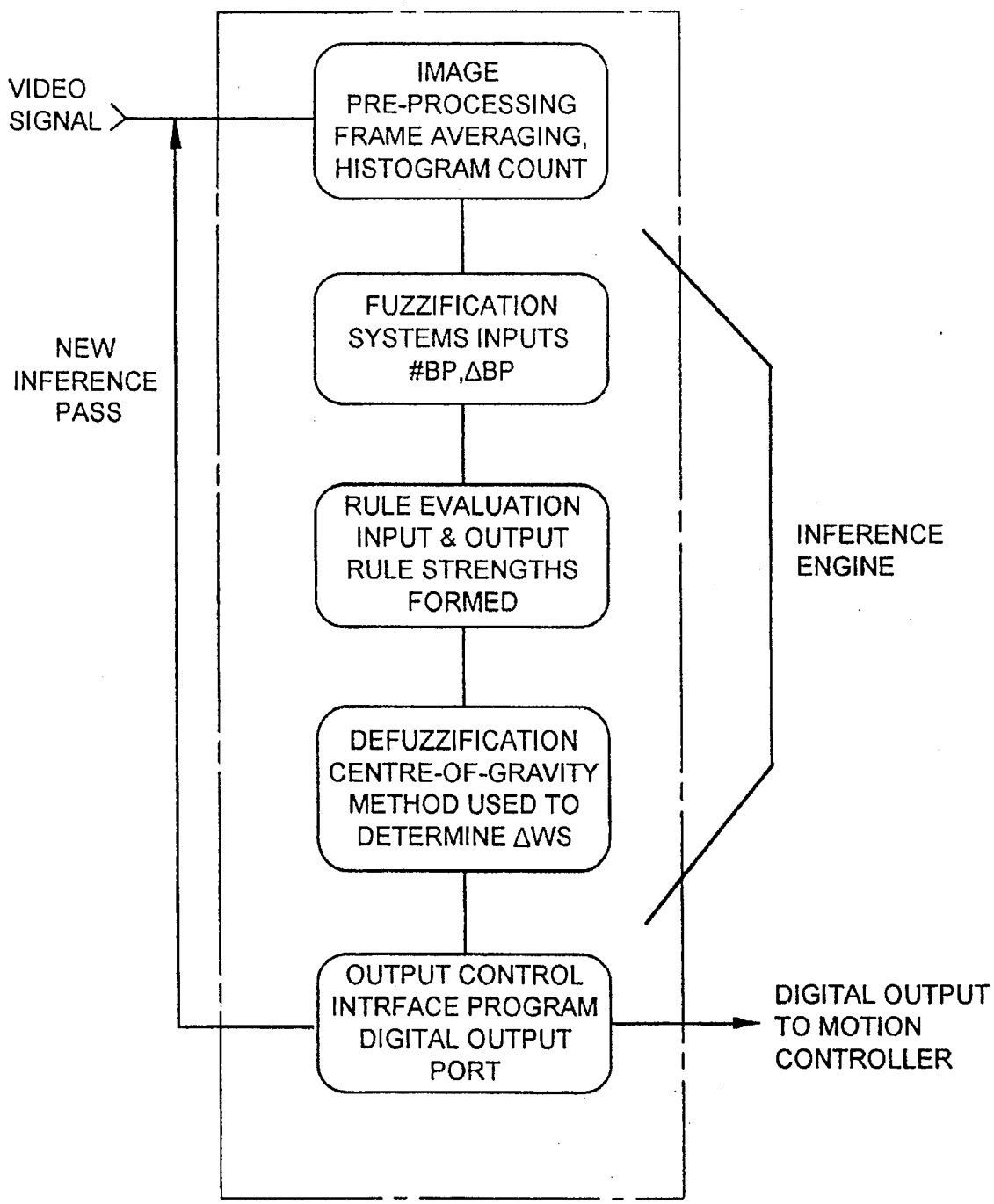
FIG. 2 is a diagram showing data flow in the fuzzy logic controller forming part of the present invention.
Figure 3:
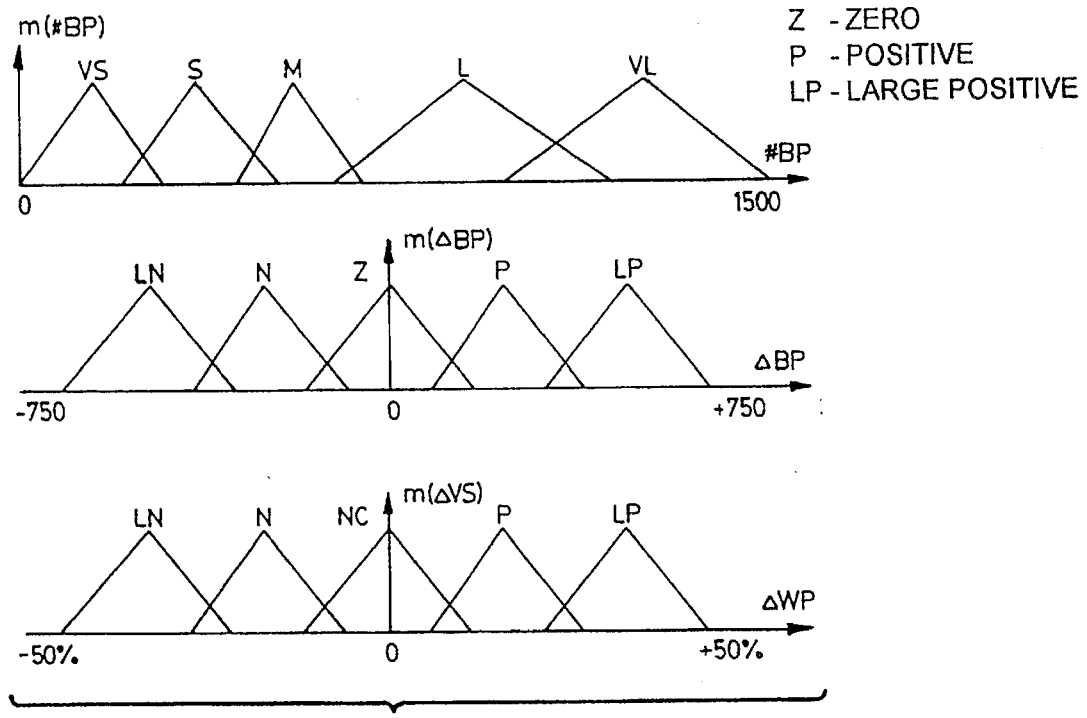
FIG. 3 displays example membership functions for the fuzzy logic controller.

FIG. 2 shows a diagram of data flow in the fuzzy logic controller for the apparatus of FIG. 1. Video frames of the laser welding process are preprocessed by the P360F framegrabber or image processor 22. Each frame is processed to acquire, through a thresholding and counting procedure, the number of bright pixels above a pre-defined number which effectively gives the spatial extent or area of the visible light emitted from the weld pool and plasma. From this elemental processing two system input variables are obtained, namely the current number of bright pixels, #BP, and the change in this count since the last calculation, ΔBP. Each system input has a numerical value which must be correlated to a linguistic value. This is accomplished through the design of membership functions consisting of a set of fuzzy set values. Example membership functions are shown in FIG. 3 and will be familiar to those skilled in the art.

Figure 4:
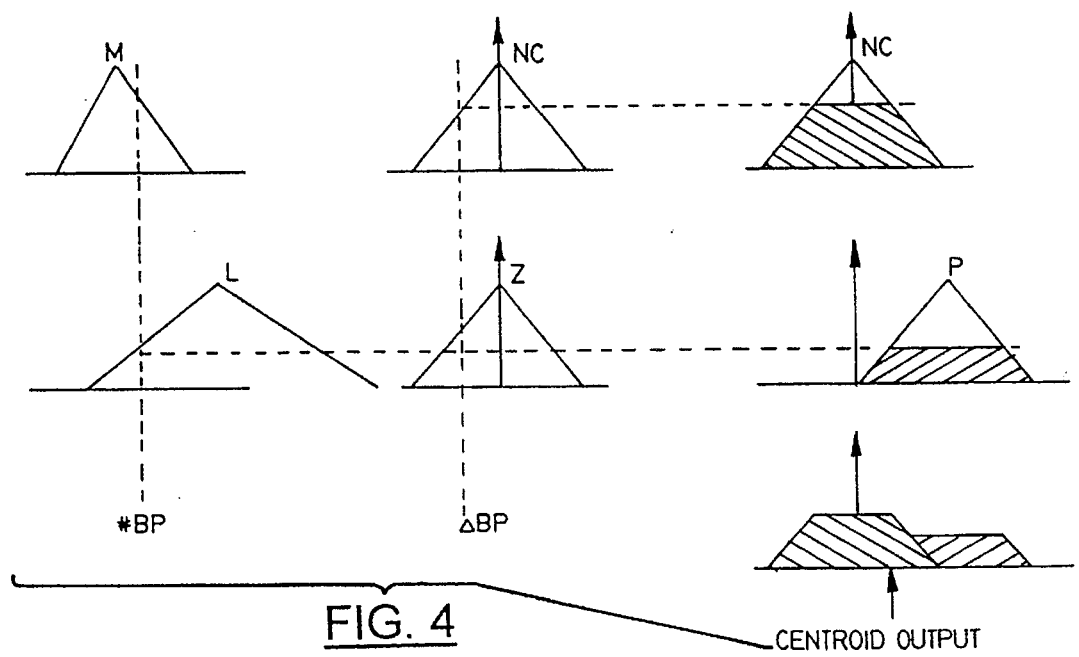
FIG. 4 graphically illustrates the rule evaluation and defuzzification procedures performed in the fuzzy logic controller.

The input data is applied to the input membership functions to determine the degree to which #BP and ΔBP is for example large or small. This is the fuzzification process. The values resulting from the fuzzification process correspond to the antecedents in the rule base which are then ANDED together using a minimum function to form the strength of the rule. This strength is then applied to each of the rule outputs or consequents. If an output has already been assigned a rule strength during the current inference pass, a maximum function is used to determine which strength should apply. The maximum function compares two values and returns the larger of the two. The defuzzification process completes the mapping from the input fuzzy sets to the output fuzzy set of weld speed values. Since the input membership functions are overlapped it is possible for conflicting actions on the welding speed to be triggered. This is resolved through a center-of-gravity algorithm to get a weighted average of the triggered output membership functions. The rule evaluation and defuzzification procedures are graphically demonstrated in FIG. 4. This fuzzy inference procedure has been implemented in the C programming language as a linked list arrangement of system input and membership function nodes. Details on the implementation of fuzzy inference using this general approach in C can be found in Viot, L., Fuzzy logic in C., Dr. Dobbs Journal, February, pp. 40–49. 1993, which is incorporated herein by reference.

Figure 5B:
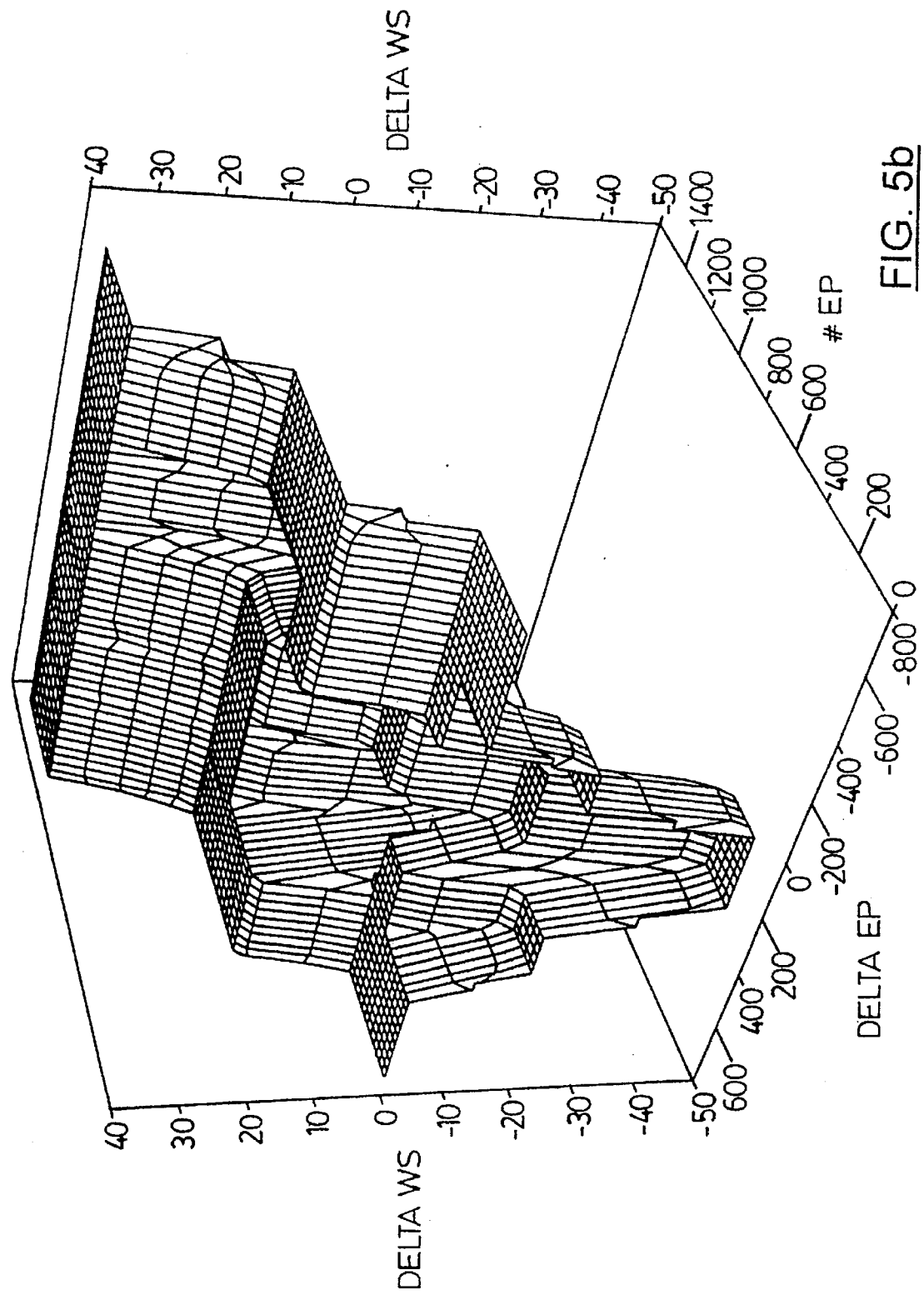
FIG. 5(b) is a 3-dimensional graph showing the control surfaces associated with the FAM of FIG. 5(a)

Important to the visual subsystem is the collection of rules which associate input conditions (numerical information from video imagery) to output control of the process (welding, cutting etc.) speed. For the embodiment of the invention using the apparatus shown in FIG. 1, a rule base has been designed for control of full penetration welding in mild steel by anticipating various input combinations of #BP and ΔBP and applying general laser welding common sense to control the welding speed WS. These rules are referred to in the art as fuzzy associative memories (FAMS). FIG. 5(*a*) shows a FAM matrix designed for a fuzzy logic controller by anticipating various input combinations of #BP and ΔBP and applying general laser welding common sense to control the welding speed. The control surface corresponding to this FAM matrix is shown in FIG. 5(*b*).

Some of the most obvious rules can be rationalized in the following manner. When good penetration is achieved no change in welding speed (ΔWS) should occur. During ideal welding conditions the #BP has been observed in a narrow range which has been given the linguistic value of medium. Similarly ΔBP, when the welding process is in a state of good penetration, fluctuates in a very small range called zero so the steady state (no change) rule for good penetration is composed as:

IF #BP is medium AND ΔBP is zero, THEN ΔWS is zero. When the welding speed is too fast and no stable keyhole has been achieved the welding fault of poor penetration is likely occurring and a correction in weld speed is required. In this case the #BP is very small and ΔBP is also very small or zero, thus the rule is written as:

IF #BP is very small AND ΔBP is zero, THEN ΔWS is negative large.

Conversely, if the welding speed is too slow and a burn through condition is occurring then #BP will be very large and ΔBP can be varying slowly, thus:

IF #BP is very large AND ΔBP is zero, THEN ΔWS is positive large.

Using this method the fuzzy inference process occurs, with a single frame used to calculate the system inputs, at a rate of 28 Hz. To create a better match between the controller and the thermal time constants involved in the welding process, frame averaging may be used. In one demonstration, 10 frames were averaged in real time before the number of bright pixels were counted. Alternatively, the magnitude or resolution of the value ΔWS through a gain coefficient may be varied to match with the thermal time constants of the laser process. Welding speeds were varied from 25 to 6 mm/sec and welding examples of poor penetration (fault), good penetration (no fault) and burn through (fault) caused by excessive dwell time were recorded. Using this method, a visual record of basic error conditions is sufficient to calibrate the controller.

Figures 5A, 6:
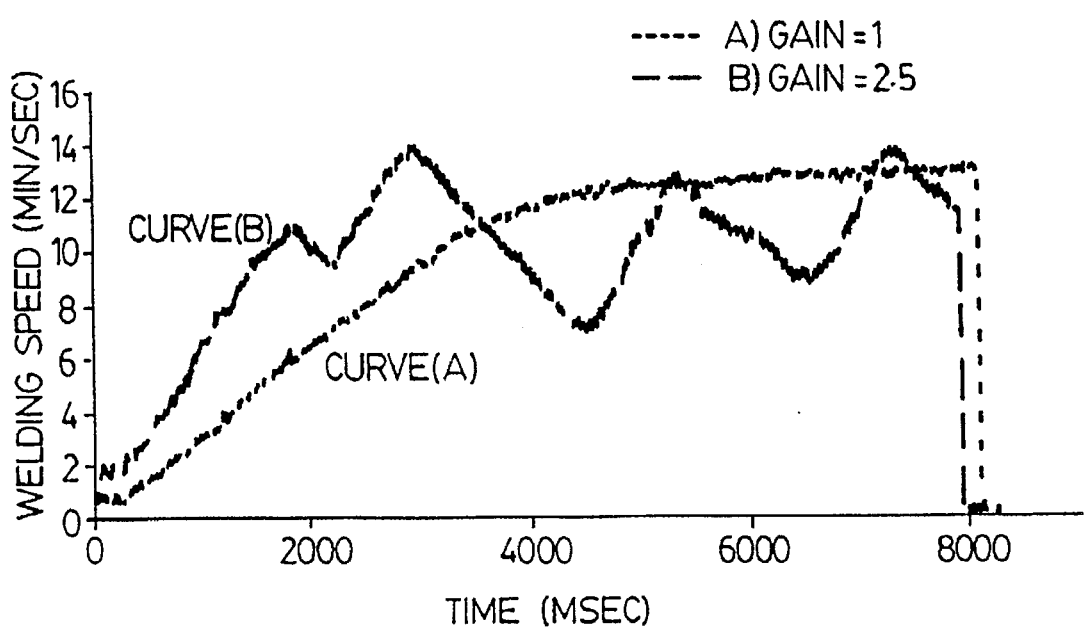
FIG. 5(a) shows a FAM (fuzzy associative matrix) forming part of the fuzzy logic controller of the present invention.
FIG. 6 displays two plots of the controlled velocity of bead on plate penetration welds in 1.2 mm thick mild steel using a $CO_2$ laser (power=1500W) with transverse argon gas shielding (flow rate of 20 l/min) with the weld speed having an initial value of $^-1$ mm/sec with the curve (a) profile showing a slow but stable increase in welding speed until good penetration is achieved at $^-13$ mm/sec. and curve (b) showing the relative gain of the system increased by a factor of 2.5.

Evidence that the controller forming the subject invention can provide for stable closed loop control of weld speed is shown in FIG. 6. The plot shows two velocity profiles of the system under closed loop control. In this demonstration, the motion controller was pre-programmed to respond (i.e. increment or decrement the welding speed) to commands from the FLC. The initial welding speed was set very low, and the intelligent visual subsystem was able to find the welding speed, given stable values of gas and laser parameters, where good penetration occurs. This shows that this method of control can be used to control the laser-material interaction through the unstable period of weld initiation. The velocity profile shown as curve (a) in FIG. 6 exhibits a slow but stable increase in welding speed to a value of ¯13 mm/sec resulting in good penetration. Increasing the relative gain of the system 2.5 times resulted in a velocity profile as shown as curve (b) in FIG. 6. The response of the system has improved slightly, however, the oscillatory behaviour indicates the system has become unstable and is underdamped.

Figure 7A:
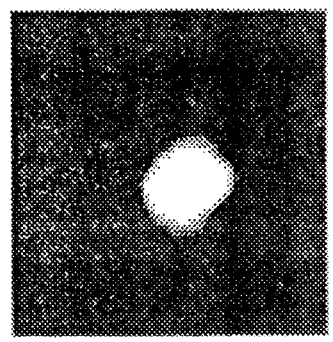
FIG. 7(a) shows a video frame of $CO_2$ laser-bead on plate interaction zone with 1.2 mm thick mild steel at a continuous power of 1500W with argon gas shielding at a weld speed of 25 mm/sec with 133 bright pixels illustrating poor penetration.
Figure 7B:
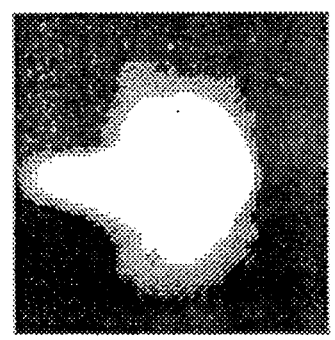
FIG. 7(b) is similar to FIG. 7(a) but at a welding speed of 16 mm/sec and 603 bright pixels illustrating good penetration.
Figure 7C:
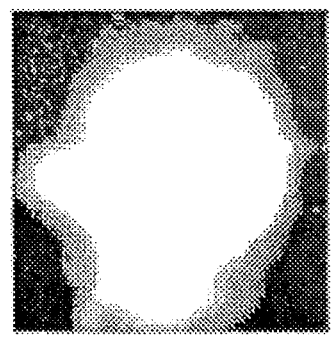
FIG. 7(c) is similar to FIG. 7(a) but at a welding speed of 6 mm/sec illustrating burn-through due to excessive dwell time.

FIGS. 7(a), 7(b) and 7(c) show video images of a $CO_2$ laser-material interaction zone on a 1.2 mm thick mild steer at a power of 1500 Watts obtained using the system of FIG. 1 indicating clearly the three conditions of poor penetration (FIG. 7(a)), good penetration (FIG. 7(b)) and burn through (FIG. 7(c)). The brilliant light produced from the part of the zone in the plasma above the keyhole region is clearly obscuring the weld pool..However, the shape and number of bright pixels are different for the three basic welding conditions. FIG. 7(a) shows an example of poor penetration at a welding speed of 25 mm/sec. The small circular bright area indicates that a stable keyhole has not yet been achieved. A rapid fluctuation in the number of bright pixels indicates intermittent plasma formation. In FIG. 7(b), full penetration through the 1.2 mm thick sheet of steel has been achieved at a welding speed of 16 mm/sec. The bright area over the keyhole has enlarged over FIG. 7(a) and fluctuates very little with time. Also visible at the trailing edge of the interaction is a bright area indicating the shape and size of the weld pool. When the welding speed has been slowed to 6 mm/sec burn through or massive melting occurs resulting in a large misshapen bright area as shown in FIG. 7(c).

Figure 8:
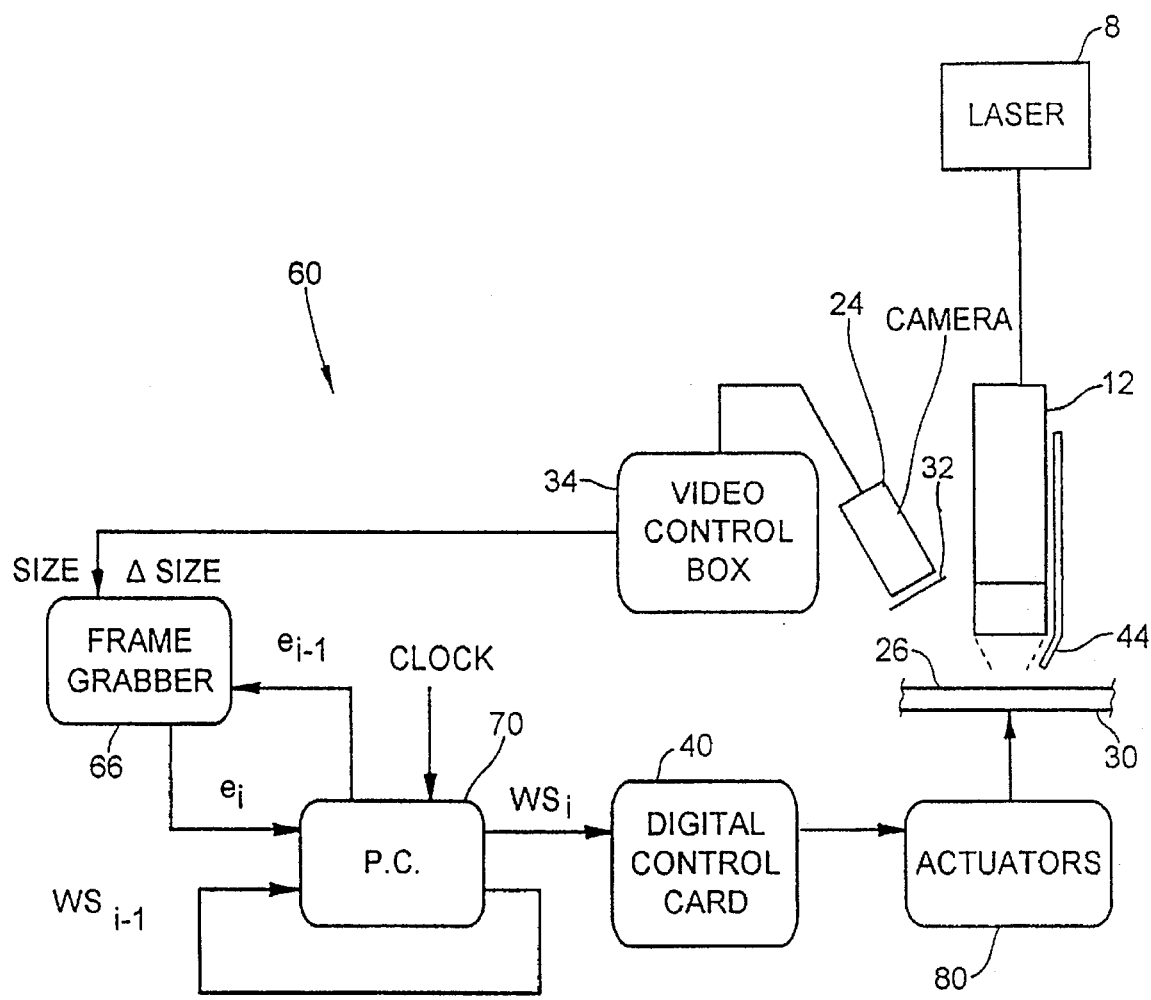
FIG. 8 is a diagrammatic representation of an alternative embodiment of the method and apparatus according to the present invention.

FIG. 8 is a diagrammatic representation of an alternative embodiment of a laser welding system 60 constructed in accordance with the present invention. Laser welding system 60 includes a visual sensor system comprising a CCD Panasonic GP-CD60 video camera 24, a Panasonic RCU GP-RC20 shown at 34, a frame grabber or visual encoder 66 with an integrated FLC software package programmed to perform all the functions of an intelligent visual sensor sub-system or visual encoder. The visual sensor subsystem provides a host controller 70 an error out value, $e_i$, directly associated with the state of the weld. In operation images from CCD camera 24 are digitized and stored in memory for image processing. Known procedures may be used to extract spatial information such as the size of the laser-material interaction zone from the image. For example, inspection of the optical images in FIGS. 7(a) to 7(c) indicates that the calculation of the length to width ratio of the laser-material interaction area gives useful shape information. Motion controller 40 is controlled by host PC 70 which in turn drives the various amplifiers and actuators shown generally at 80 used to control the speed of workpiece 30 relative to the laser beam.

The inventors have found it sufficient to threshold the image at a useful pixel intensity value (binarize) and count the pixels that are on (or white). This number is then passed to the fuzzy logic controller as one of the system inputs for the current inference pass in the FLC. For increased stability of the system, two other system inputs have been used in this system. The previous error out value $e_i$, and the previous zone size $s_i$ is returned to the visual subsystem from the host. The FLC is initialized to accept these system inputs as a system of linked lists in memory. These structures are defined in ANSI C and shown in Table I which lists the structure prototypes in ANSI C for building lists of systems inputs, outputs (io_type) and the structure for creating each set of membership functions (mf_type) in each fuzzy logic controller. Each structure has a pointer member that points to instance of its own data type. This enables a list to be formed by linking the next pointers together.

The membership functions are initialized to values appropriate to the thickness and material type. This "universe of discourse" of each set of membership functions are programmed so that the host PC which can contain a performance metric can adjust or fine tune each set by passing a new base point parameter back to the visual encoder. Table II shows how the structures of mf_type Wc_Functions, the set of membership functions describing the universe of discourse for the system input $s_i$, can be initialized using the variable basept. Changing the value of basept will adjust the position of the OK fuzzy set and the resulting overlap of the neighbouring sets. This allows the fuzzy logic controller to be adapted by reinitializing the structure.

Figure 9A:
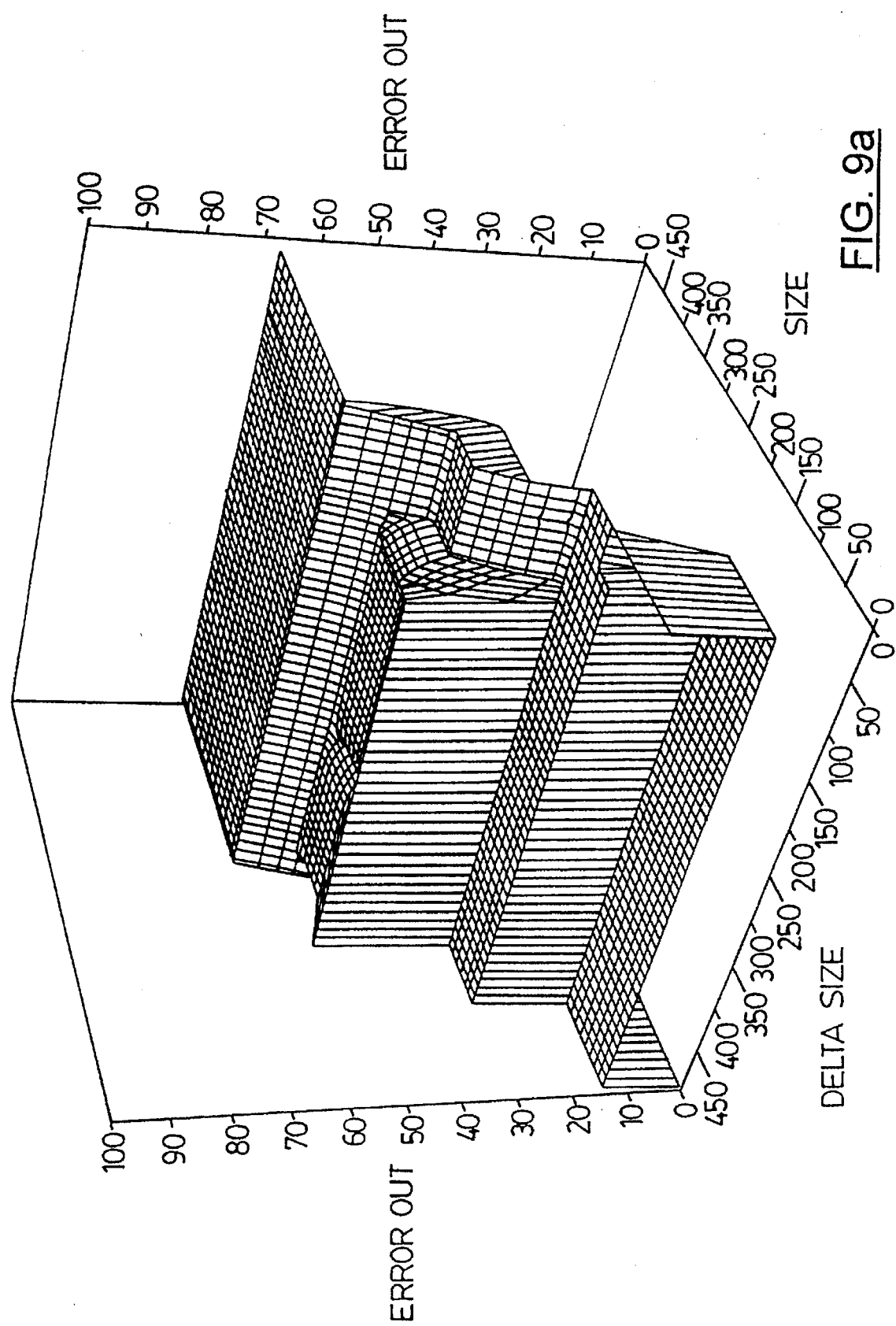
FIG. 9(a) is a 3-dimensional graph showing one aspect of the control surface for use with a visual encoder with error in, $e_{i-1}$, fixed at a value of 50.
Figure 9B:
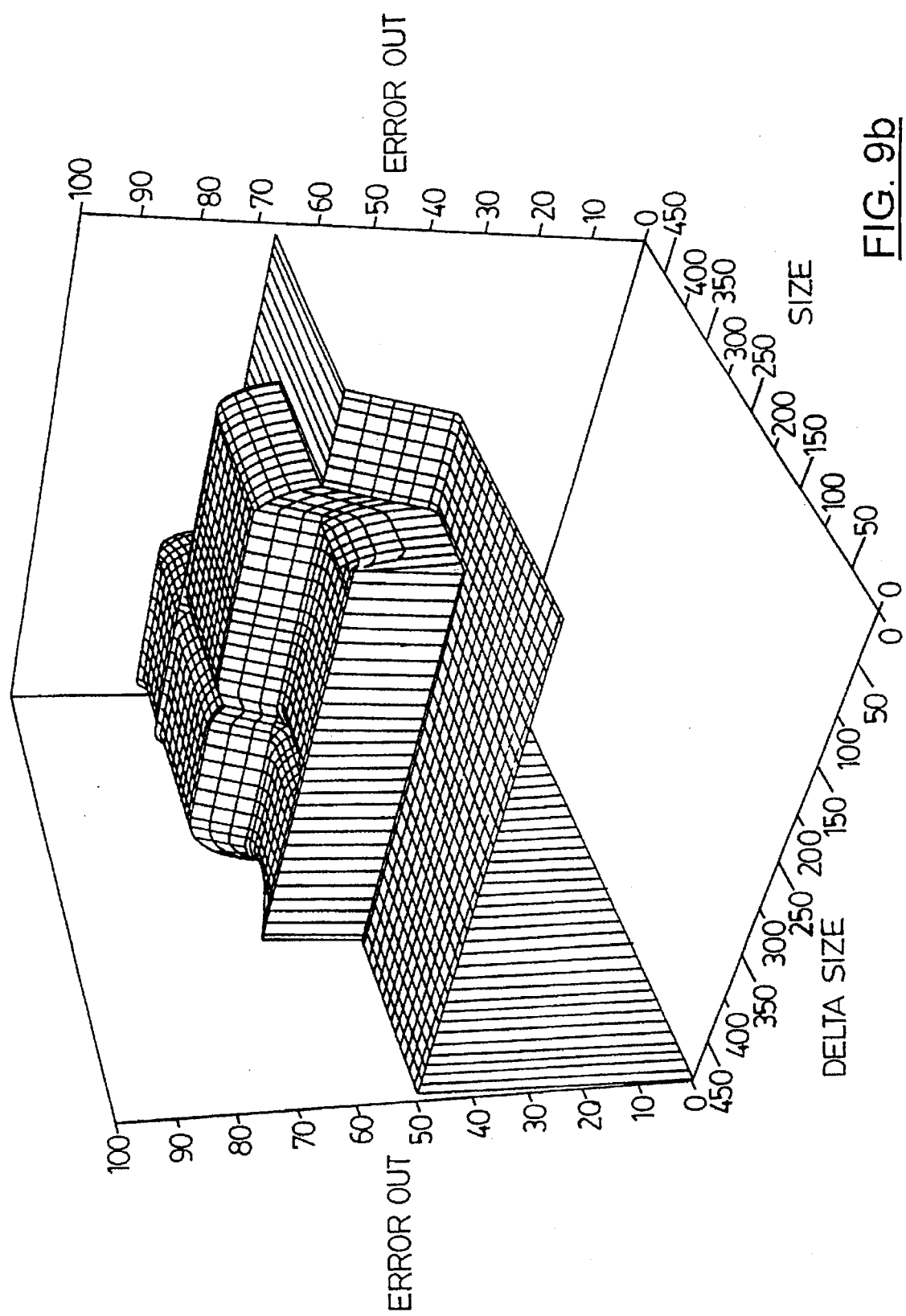
FIG. 9(b) is a 3-dimensional graph showing one aspect of the control surface for use with a visual encoder with error in, $e_{i-1}$, fixed at a value of 67.
Figure 9C:
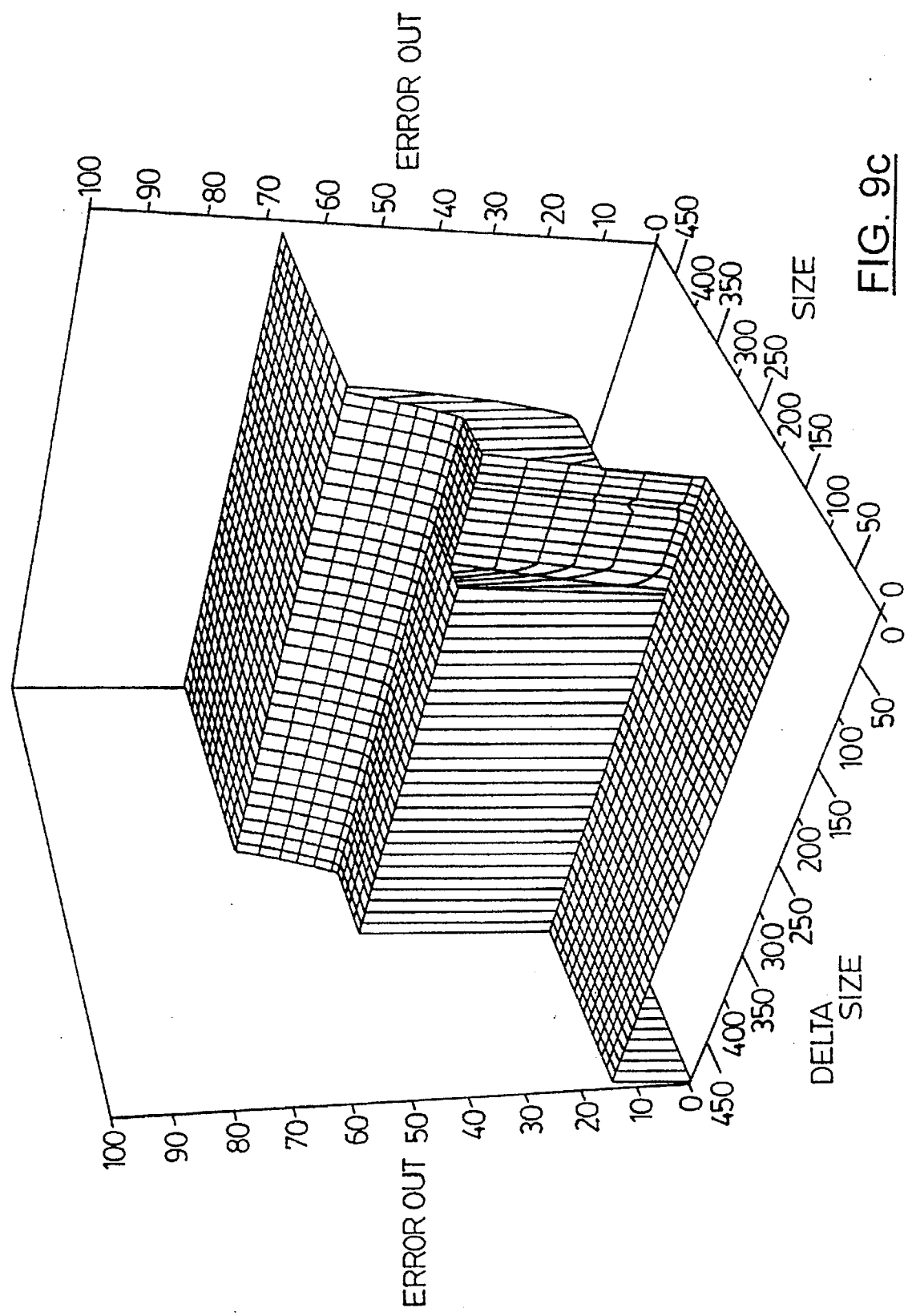
FIG. 9(c) is a 3-dimensional graph showing one aspect of the control surface for use with a visual encoder with error in, $e_{i-1}$, fixed at a value of 32.

After the degree of membership for $s_i$ and Δs has been computed for all the membership functions, the rule base must be evaluated. The control surfaces shown in FIGS. 9(a) to 9(c) show the effect and functionality of the rules implemented in the visual encoder. This implementation or embedded expertise was programmed in the visual encoder to control $CO_2$ laser welding in the aluminum alloy 7075. For the 4-dimensional system of inputs and single output, size, $s_i$, change in size from the previous pass, Δs=abs($s_i$−$s_{i-1}$), error in from the previous pass, $e_{i-1}$, and error out on the current pass, $e_i$, the control surfaces have been plotted in 3-dimensions for various values of $e_{i-1}$. In FIG. 9(a) $e_{i-1}$ is fixed at 50 which was set up as the neutral or the value for no error and no change required in the welding speed. Similarly size, $s_i$, and Δs are set up to range from 0 to 500 pixels. Where an real time adaptation in the basepoint has occurred an ideal size for the visual system is 250, which is determined from an earlier set of training welds. The control surface indicates that there is a range of values where the value for $s_i$ lies in a small region around 250 and Δs from 0–150 where $e_i$ will again return to the host with a value of 50. This accounts for a normal and required fluctuation in the visual signal due to volatile nature of the zinc component in the aluminum alloy. Close inspection of the surface will indicate that if there has been no fluctuation in area (Δs close to zero) the error will be returned somewhat smaller than 50 indicating insufficient energy being deposited in the weld. If $s_i$ is small, then, since previously there was a no error reading, it does not matter if Δs is changing and $e_i$ will be returned to the host as a value less than 50 indicating that the weld speed should decrease. Similarly if $s_i$ is large and $e_{i-1}$ is 50, the visual indicators are that weld speed should increase. The steps in the control surface are a function of the trapezoidal shape chosen for the membership functions and demonstrate that no special attention to membership function shape is required for stable control.

In FIG. 9(b) $e_{i-1}$ is fixed at a value of 67 where the visual indicators from the laser weld have resulted in a positive error signal from the previous inference pass. This will occur when visual inspection of the weld has indicated that too much energy is being deposited into the weld. In this situation, the FLC will return a neutral value for any small or adequate value of $s_i$. This is important since on the previous pass $s_i$ was large and a small current value of $s_i$ should not be responded to on the chance the fluctuation is due to a momentary expulsion of zinc vapor from the weld pool. When $s_i$, and to a lesser extent Δs, is large the controller will respond with a error value greater than 50, reacting now more strongly than when $e_{i-1}$=50.

In FIG. 9(c) $e_{i-1}$ is fixed at a value of 32 where the visual indicators from the laser weld have resulted in a negative error signal from the previous pass. This condition can indicate that insufficient coupling of laser energy into the workpiece is occurring and must be responded to with more strength than in the case of a large positive error. This also shows that the FLC can be tailored to the thermal characteristics of a weld pool or other laser process where a change of state has occurred. Namely, that a molten pool can be kept stable more readily by increasing the energy deposition rate, i.e. adding more heat by decreasing the welding speed than by decreasing the energy deposition rate by increasing the welding speed. All of the above mentioned controller actions are extremely difficult or impossible to program using any PID (proportional, integral, derivative) algorithmic approach.

Table III lists the complete set of rules used to implement the visual encoder controller for welding the aluminum alloy 7075-0 and 7075-T6 with sheet thickness varying from 1–3 mm in the butt configuration. The rules are listed in the form of IF (antecedent $s_i$) and (antecedent-Δ$s_i$-optional) and (antecedent-error in optional) THEN (consequent-error out). The fuzzy sets for the system input error in and the system error out were given the labels nlarge (negative large), nmed (negative medium), zero, pmed (positive medium) and plarge (positive large). The fuzzy sets for the system input $s_i$ and ΔS were given the labels VS (very small, S (small), OKAY, L (large) and VL (very large).

Table IV is an ANSI C code listing showing how the assigned strengths from the process of rule evaluation can be defuzzified into a single error out value. The listed ANSI C code has been generalized to handle any number of system outputs even though this embodiment uses a single error output. The linked list for the set of membership functions (error out) is evaluated by use of a for loop until the next pointer has a NULL value. The defuzzification process consists of the calculation of a centroid point on the x-axis for each membership output function, then the membership functions are limited in height by the applied rule strength and the areas of the membership functions are computed. Then the output value is evaluated by a weighted average of the centroid points and the computed areas. Those skilled in the art will also recognize that a similar for loop is used with respect to the input membership functions in the fuzzification process.

Figure 10:
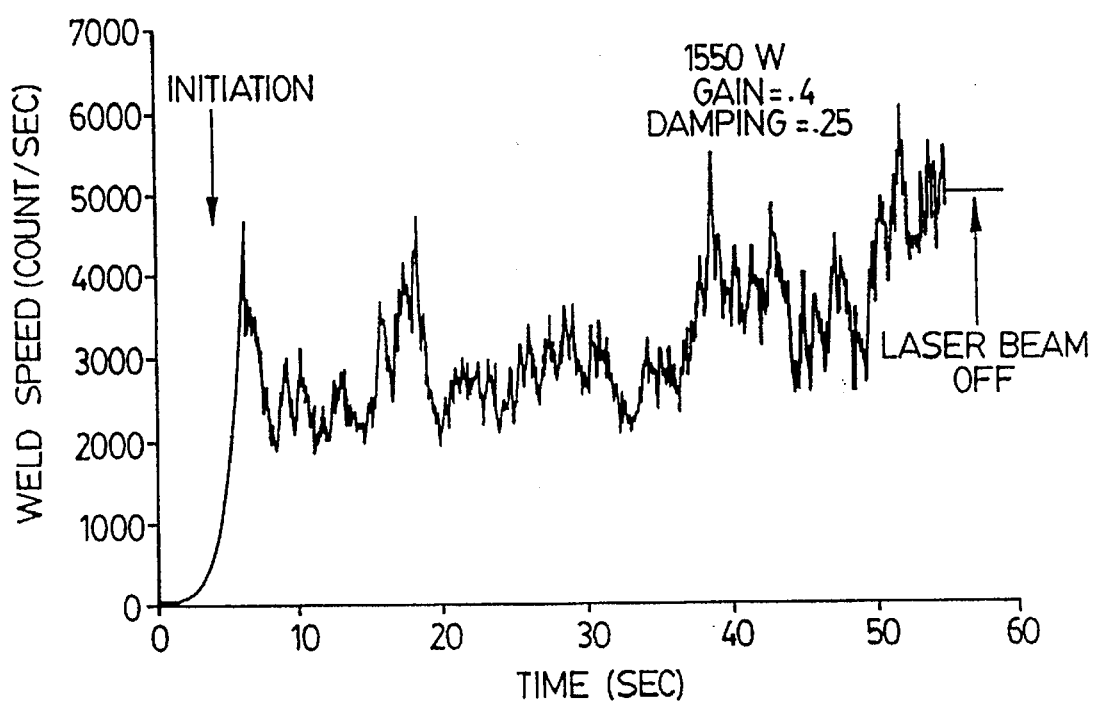
FIG. 10 shows controlled conduction limited weld speed as a function of time in aluminum alloy Al7075.

FIG. 10 shows a plot of $CO_2$ laser weld speed as a function of time where the weld speed has been controlled by the system as described above. The $CO_2$ laser power was held constant at 1550W cw with a gain of 0.4 and damping 0.25. Two 2 mm thick aluminum sheets (Al7075) were clamped together in the butt configuration. The plot shows how the weld speed was controlled through the initiation process and then compensated for the rapid changes in coupling between the laser beam and the highly reflective aluminum workpiece. These rapid changes in coupling are due to a varying amount of aluminum in the solid phase at the leading edge of the weld and heat loss due to violent expulsions of material as the sub-surface zinc alloy vaporizes. The resulting weld showed even full penetration down the length of the weld with excellent mechanical properties. Also, it is interesting to note that, as the plot shows, the intelligent visual encoder has been configured to remain neutral when the laser beam is toggled off.

Referring again to FIG. 8, it is to be noted that the control algorithm for implementing the necessary I/O to the motion system has been moved from the visual subsystem as described in FIG. 1. Since the error signal coming from the visual encoder is clearly linear relating directly to the weld speed the control algorithm can be implemented using a simple PD (proportional-derivative) equation. This embodiment of the method and apparatus is useful since in some applications the I/O requirements for control of system variables are such that they must be managed off of the image processing board. Examples of this type of situation are when analog voltages are required to adjust laser power or when the invention is configured as an embedded system located some distance from the host controller or CNC.

It will be appreciated that other types of sensors having digitizable outputs for numerical control may be used. For example, acoustic sensors, temperature sensors and other optical sensors such as photodiodes instead of CCD video cameras may be used as the probe of the laser-material interaction zone.

Information about the laser-material interaction zone may be obtained from acoustic emissions. The output of a microphone, being a transducer converting sound to an analog voltage, may be digitized by a programmable data acquisition board. For example a PG board of this type is the DAP2400 series programmable data acquisition boards commercially available from Microstar Laboratories Inc. (Bellevue, W.A., U.S.A.). The DAP2400 series is fully programmable with an embedded real time operating system and has both a 80C186 CPU and a dedicated DSP56001 for performing fast fourier transforms in real time. In this application the intelligent sensor subsystem comprises a microphone, a data acquisition board (DAP2400) and the software to embed the FLC on the data acquisition board. To extract the necessary diagnostic information from the acoustic signal a fast fourier transform is performed on the digitized acoustic signal and the resulting frequency spectrum is averaged over the band containing the relevant acoustic information. The resulting numerical value, in the same manner as the values #BP or $s_i$, as used in the examples described above are passed as a system input to the FLC inference process. In this application the intelligent acoustic controller may be configured to pass a dedicated error value back to the host PC or directly manage the laser CNC (for controlling laser power) since the board has digital-to-analog conversion capabilities on board.

Similarly, a photodiode sensor which converts light to a voltage signal may be interfaced with the data acquisition board to detect specific wavelengths as disclosed by Chaen et al. The two system inputs to the FLC would be the digital values representing the intensity of the infrared radiation signal and the intensity of the ultra-violet signal.

Thus one subsystem may have embedded expertise relating to the analysis of acoustic signals from the laser-material interaction zone. Another subsystem may have expertise relating to auto-focusing using a sensor measuring the capacitance between the metal workpiece and the cutting or welding nozzle. In this case the host control procedures can be implemented using fuzzy logic techniques with the system inputs originating as the dedicated error value from each intelligent sensor subsystem. Multiple sensors may also be combined in one system with each sensor subsystem provided with its own dedicated controller.

The fuzzy logic based control method using feedback from one or more types of sensors forming the present invention is useful for different kinds of laser processing and is not restricted to laser welding. The process may be used for laser cutting, laser cladding or laser heat treating to mention just a few. The fundamental goal of the processing method is to control the rate of energy deposition from the laser beam into the workpiece by feedback control of laser power and laser intensity by control of laser spot size on the workpiece.

In laser cutting or trimming of complicated 2 and 3 dimensional shapes, a great deal of preprogramming of the laser CNC and beam delivery system is required to ensure that a correct amount of laser energy is being deposited into the leading edge of the kerf. This is important when the process speed must be slowed during a corner rounding or when the desired path of the cut approaches close to the edge of the workpiece. In either of these situations there is the problem of reducing the average laser power so that massive melting of the part is avoided. To obviate this difficulty, and reduce the time required to pre-program this information into the specific part program, a dedicated error signal associated with real-time analysis of the cutting interaction can be used to control laser power. This may be achieved by using the present method with either a CCD camera and image processor acquiring the dimensions of the kerf, or by analyzing acoustic emissions using a microphone and a programmable data acquisition board which are generated from the process of the assist gas flushing the thin molten layer form the leading edge of the interaction.

Therefore, while the invention has been described and illustrated with respect to the embodiments disclosed herein, it will be appreciated that numerous variations of these embodiments may be made without departing from the scope of the invention.

TABLE I

```
/* io_type structure builds a list of system inputs and a list of system outputs. After
initialization, these lists are fixed, except for value field which is updated every
inference pass. */
typedef struct io_type{
        char name [MAXNAME];            /* name of system input/output */
        double value;                   /* value of system input/output */
        struct mf_type *membership_functions;  /* list of membership or output
strength  struct io_type *next;                /* pointer to next input/output
*/
      }Io_type;
typedef Io_type *Io_typeptr;
Io_typeptr System_Inputs;
Io₁.typeptr System_Outputs;
/* Membership functions are associated with each system input and output */
typedef struct mf_type{
        char name[MAXNAME];     /* name of membership function (fuzzy set) */
        double value;           /* degree of membership or output strength */
        double point1;          /* leftmost x-axis point of membership fn. */
        double point2;          /* rightmost x-axis point of mem. fn. */
        double slope1;          /* slope of left side of mem. fn. */
        double slope2;          /* slope of right side of mem. fn. */
        struct mf_type *next;   /* pointer to next membership fn. */
      }Mf_type;
typedef Mf_type *Mf_typeptr;
Mf_typeptr Wc_Functions; /*list head for input wc mfs-list empty*/
Mf_typeptr Cwc_Functions;/*list head for inputcwc mfs-list empty*/
Mf_typeptr Errin_Functions;/*list head for input error mfs-list empty*/
Mf_typeptr Errout_Functions;/*list head for input error mfs-list empty*/
```

TABLE II

```
/*initialize SMALL input membership function for s_i inputs*/
/*base point initially 250*/
Wc_Functions = (Mf_typeptr)malloc(sizeof(Mf_type));
strcpy(Wc_Functions->name,"S");
Wc_Functions->value = 0;
Wc_Functions->point1 = 0;
Wc_Functions->point2 = basept-basept*0.05;
Wc_Functions->slope1 = 20.0;
Wc_Functions->slope2 = 100/(basept*0.15);
Wc_Functions->next = NULL;
/*initialize OKAY input membership function for s_i */
p = (Mf_typeptr)malloc(sizeof(Mf_type));
strcpy(p->name,"OK");
p->value = 0;
p->point1 = basept-basept*0.15;
p->point2 = basept+basept*0.15;
p->slope1 = 100/(basept*0.15);
p->slope2 = 100/(basept*0.15);
p->next = NULL; /* NULL assigned p->next - end of list */
Wc_Functions->next = p; /* Input_Functions->next addresses
struct at p*/
/*initialize LARGE input membership function for s_i */
p = (Mf_typeptr)malloc(sizeof(Mf_type));
strcpy(p->name,"L");
p->value = 0;
p->point1 = basept+basept*.05;
p->point2 = basept+basept*0.5;
p->slope1 = 100/(basept*0.15);
p->slope2 = 100/(basept*0.5);
p->next = NULL; /* NULL assigned p->next - end of list */
Wc_Functions->next->next = p; /* Input_Functions->next addresses
struct at p*/
/*initialize VERY LARGE input membership function for s_i */
p = (Mf_typeptr)malloc(sizeof(Mf_type));
```

TABLE II-continued

```
strcpy(p->name,"VL");
p->value = 0;
p->point1 = basept+basept*.035;
p->point2 = basept+basept*1.5;
p->slope1 = 100/(basept*0.5);
p->slope2 = 100/(basept*0.1);
p->next = NULL; /* NULL assigned p->next - end of list */
Wc_Functions->next->next->next = p; /* Input_Functions->next
addresses struct at p*/
```

TABLE III

IF Si is OKAY and ΔSi is VL and Errin is Zero then Errout is pmed
IF Si is OKAY and ΔSi is VL and Errin is pmed then Errout is plarge
IF Si is OKAY and ΔSi is Okay and Errin is Zero then Errout is Zero
IF Si is OKAY and ΔSi is VS and Errin is Zero then Errout is nmed
IF Si is OKAY and ΔSi is VS and Errin is nmed then Errout is nlarge
IF Si is OKAY and ΔSi is VS and Errin is nlarge then Errout is nlarge
IF Si is OKAY and ΔSi is VL and Errin is plarge then Errout is plarge
IF Si is OKAY and ΔSi is VL and Errin is pmed then Errout is plarge
IF Si is OKAY and ΔSi is VL and Errin is zero then Errout is pmed
IF Si is S and ΔSi is okay and Errin is zero then Errout is nmed
IF Si is VS and ΔSi is S and Errin is zero then Errout is nlarge
IF Si is S and ΔS is okay and Errin is nmed then Errout is nlarge
IF Si is S and ΔS is S and Errin is nmed then Errout is nlarge
IF Si is L and ΔS is L and Errin is zero then Errout is pmed
IF Si is L and ΔS is L and Errin is pmed then Errout is plarge
IF Si is L and ΔS is VL and Errin is pmed then Errout is plarge
IF Si is VL and ΔS is VL and Errin is pmed then Errout is plarge
IF Si is VL and ΔS is VL and Errin is plarge then Errout is plarge
IF Si is Vs and ΔS is Vs and Errin is nlarge then Errout is nlarge
IF Si is Vs and ΔS is Vs and Errin is zero then Errout is nmed
IF Si is Vs and ΔS is Vs and Errin is nmed then Errout is nlarge
IF Si is s and ΔS is s and Errin is zero then Errout is nmed
IF Si is s and ΔS is s and Errin is nmed then Errout is nlarge
IF Si is s and ΔS is s and Errin is nlarge then Errout is nlarge
IF Si is OKAY and ΔS is L and Errin is plarge then Errout is plarge
IF Si is OKAY and ΔS is L and Errin is large then Errout is plarge
IF Si is OKAY and ΔS is L and Errin is zero then Errout is large
IF Si is OKAY and ΔS is L and Errin is Zero then Errout is pmed
IF Si is OKAY and ΔS is L and Errin is pmed then Errout is plarge
IF Si is OKAY and ΔS is L and Errin is plarge then Errout is plarge
IF Si is OKAY then Errout is zero
IF Si is large then Errout is Pmed
IF Si is vlarge then Errout is Pmed

TABLE IV

```
/*Defuzzification*/
/*compute a defuzzified value for each system output*/
for (so=System_Output; so!=NULL; so=so->next){
        sum_of_products=zero;
        sum_of_areas=0;
        for (mf=so->membership_functions;mf!=NULL;Mf=mf->next{
        /*area=compute_area_of_trapezoid(mf);*/
        /*Compute Area of Trapezoid-Each inference pass produces a new set of
output strengths which affect the areas of trapezoidal membership functions used
in center-of-gravity defuzzification. Area values must be recalculated with each
pass. Area of trapezoid is h*(a+b)/2, where h=height=output_strength=mf-
>valueb=base=mf->point2-mf->point1 a=top=must be derived from h,b and
slopes 1&2*/
        base=mf->point2-mf->point1;
        run_1=mf->value/mf->slope1;
        run_2=mf->value/mf->slope2;
        top=base-run_1-run_2;
        area=mf-*value*(base + top)/2;
        centroid=mf->point1 + (mf->point2-mf->point1)/2;
        sum_of_products+=area*centroid;
        sum_of_areas+=area;
        }
        if (sum_of_areas>0)
                so->value=sum_of_products/sum_of_areas;/*weighted average*/
```

Therefore what is claimed is:

1. A method of real-time control of processing variables in laser processing of a workpiece using fuzzy logic, comprising;

a) locating the workpiece with respect to a laser so that in use a laser beam emanating from the laser impinges on the workpiece to form an interaction zone;

b) detecting signals emitted from the interaction zone due to the interaction of the laser beam with the workpiece and sorting and storing the signals according to at least two preselected characteristics of the interaction zone, whereby signals sorted according to one of the preselected characteristics are stored as a first set of input variables and signals sorted according to the second preselected characteristic are stored as a second set of input variables;

c) processing said first and second set of input variables to fuzzify the first and second set of input variables wherein said fuzzified first and second set of input variables form antecedents in a rule base, logically combining said antecedents to form a strength of a rule in said rule base, applying said rule strength to a consequent of the rule to assign said strengths to membership output functions, and defuzzifying said membership output functions to produce an output value;

d) inputting said output value to means for adjusting at least one processing variable; and e) adjusting said at least one processing variable responsive to said output value.

2. The method according to claim 1 wherein the signals are accoustic signals detected by an accoustic signal detector.

3. The method according to claim 1 wherein the signals are infrared signals detected by an infrared signal detector.

4. The method according to claim 1 wherein the signals are ultraviolet signals detected by an ultraviolet signal detector.

5. The method according to claim 1 wherein said process of storing said signals includes storing said signals in a storage medium for providing a record of the laser processing of said workpiece.

6. The method according to claim 1 wherein the signals are infrared signals detected by a camera sensitive in the infrared portion of the spectrum.

7. A method according to claim 1 wherein said laser process is laser welding and said at least one processing variable is a function of welding speed.

8. A method according to claim 1 wherein said signals are visible signals detected by an optical signal detector.

9. An apparatus for control of process variables in the laser processing of a workpiece using fuzzy logic, comprising;

a) means for locating the workpiece with respect to a laser so that in use a laser beam from the laser impinges on the workpiece to form an interaction zone;

b) a signal detector for detecting signals emitted from the interaction zone due to the interaction of the laser beam with the workpiece and means for sorting and storing the signals according to at least two preselected characteristics of the interaction zone, whereby signals sorted according to one of the preselected characteristics are stored as a first set of input variables and signals sorted according to the second preselected characteristic are stored as a second set of input variables;

c) a signal processor for processing said first and second set of input variables by fuzzifying the first and second set of input variables wherein said fuzzified first and second set of input variables form antecedents in a rule base, logically combining said antecedents to form a strength of a rule in said rule base, applying said rule strengths to a consequent of the rule to assign said strengths to membership output functions, and defuzzifying said membership output functions to produce an output value; and d) means responsive to said output value for adjusting at least one processing variable.

10. The apparatus according to claim 9 wherein said signal detector is an acoustic signal detector and the mans for sorting said signals is an acoustic processor coupled to said acoustic signal detector.

11. The apparatus according to claim 9 wherein said signal detector includes an ultraviolet signal detector and an infrared signal detector and the means for sorting said signals are ultraviolet and infrared processors coupled to said ultraviolet and infrared signal detectors respectively.

12. The apparatus according to claim 9 wherein said means for storing said signals includes a computer storage means for providing a record of the laser processing of said workpiece.

13. The apparatus according to claim 9 wherein said signal detector is a camera operable to detect signals in the infrared portion of the spectrum.

14. Apparatus according to claim 9 wherein said signal detector is an optical signal detector.

\* \* \* \* \*